J. A. SINGMASTER AND F. G. BREYER.
MANUFACTURE OF LITHOPONE.
APPLICATION FILED FEB. 8, 1922.
1,414,793.
Patented May 2, 1922.
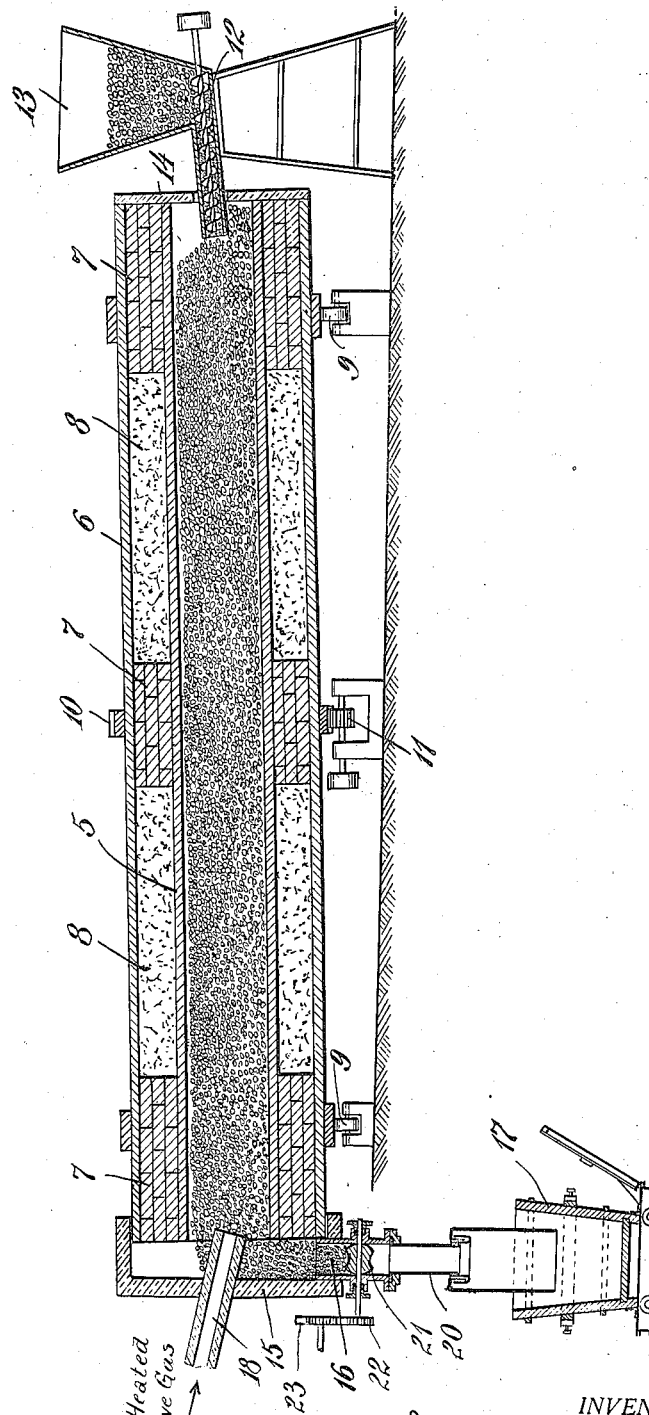
INVENTORS
James A. Singmaster
Frank G. Breyer
BY
Pennie, Davis, Marvin & Edmonds ATTORNEYS

UNITED STATES PATENT OFFICE.

JAMES A. SINGMASTER AND FRANK G. BREYER, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF LITHOPONE.

1,414,793.  Specification of Letters Patent.  Patented May 2, 1922.

Application filed February 8, 1922. Serial No. 535,078.

*To all whom it may concern:*

Be it known that we, JAMES A. SINGMASTER and FRANK G. BREYER, citizens of the United States, residing at Palmerton, county of Carbon, State of Pennsylvania, have invented certain new and useful Improvements in the Manufacture of Lithopone; and we do hereby declare the following to be a full, clear, and exact description of the invention, such as will enable others skilled in the art to which it appertains to make and use the same.

The present invention relates to the manufacture of lithopone and has for its object the provision of an improved method of calcining lithopone.

In the manufacture of lithopone, the precipitate of zinc sulfide and barium sulfate resulting from the interaction of solutions of zinc sulfate and barium sulfide is filter-pressed and, after appropriate drying, is heated or calcined and the hot product plunged directly from the heating chamber into cold water. It has heretofore been customary in actual practice to carry out the heating or calcining of the raw or crude lithopone in externally heated muffles or retorts. In accordance with one of the heretofore customary methods of calcining lithopone, a layer of the crude lithopone is charged on to the bottom of a horizontal muffle externally heated to a dull red heat. In such an operation, that portion of the lithopone lying on the highly heated bottom of the muffle is liable to be overheated, while other portions of the charge may not be sufficiently heated. An attempt is made to avoid the effect of this non-uniformity of heating by stirring the charge from time to time. This is only a partial remedy, entails the use of skilled labor and increases the difficulty of maintaining the proper atmosphere in the muffle. In our copending patent application, Serial No. 342,523, filed December 4, 1919, we have described an improved method of calcining lithopone which consists generally in progressively passing the lithopone through a heated upright retort of such proportions and so heated as to secure uniform heating of the lithopone in its passage therethrough.

In these heretofore customary methods of muffling lithopone, the charge of lithopone within the muffle or retort is brought to the desired temperature by heat externally applied to the muffles or retorts. In the case of horizontal muffles, the operation is intermittent and overheating of portions of the charge is practically inevitable. In the case of upright or vertically disposed muffles or retorts, when operated in accordance with the principles described in our aforementioned patent application, the uniform muffling of the lithopone is dependent upon careful control and regulation of the temperature of the heating gases for the retort.

In contradistinction to these heretofore customary methods of muffling lithopone, in which heat is conveyed to the lithopone through the walls of the muffle or retort, the present invention contemplates an improved method of calcining lithopone in which the lithopone is heated by passing therethrough and in contact therewith a non-reactive gas, which gas is heated to a temperature approximating the temperature at which it is desired to heat or calcine the lithopone. Thus, in accordance with our present invention, the heat required to raise the lithopone to the desired calcining temperature is imparted to the lithopone in large part at least by the highly heated non-reactive gas which is passed through the lithopone and in contact therewith. Preferably, we prefer to use superheated dry steam as the non-reactive gas, although it will be understood by those skilled in the art that other non-reactive gases are available for this purpose.

In carrying out our invention, the crude lithopone, after appropriate drying, is placed in an appropriate chamber or receptacle, suitably insulated to minimize the radiation of heat therefrom, and the non-reactive gas, heated to an appropriately high temperature, is passed through the lithopone and in contact therewith. The temperature to which the non-reactive gas should be heated depends upon the desired calcining temperature of the lithopone. Where no other source of heat is employed, the non-reactive gas should be heated by a temperature sufficiently in excess of the desired calcining temperature to compensate for any losses of heat by radiation. Where external heating is employed, for heat insulating purposes or otherwise, the temperature of the non-reactive gas may be lower than the temperature at which it is desired to calcine the lithopone. In all cases, however, the temperature of the non-reactive gas, at the time of its introduction into the lithopone to be calcined, will approximate the temperature at which it is desired to calcine the lithopone, and the heat required in the calcining operation will be derived in large part at least from the highly heated non-reactive gas.

The receptacle or chamber for holding the lithopone during the calcining operation may be of various types and forms. For example, chambers or receptacles similar to the heretofore customary horizontal muffles may be employed, or specially constructed chambers of rectangular, circular or elliptical cross section may be used. The calcining of the lithopone in apparatus of this type will be an intermittent operation, and will involve charging an appropriate amount of the crude lithopone into the chamber or receptacle, and then introducing into the lithopone and in contact therewith the highly heated non-reactive gas for such a period as is necessary to ultimately raise substantially every particle of the lithopone to the desired muffling temperature, and without overheating any portion of the lithopone. In order to properly conserve the heat, it is essential that the lithopone-containing chambers or receptacles be thoroughly covered and protected by suitable heat insulating material. Where the method of the present invention is practiced in conjunction with horizontal muffles of the type heretofore used for muffling lithopone, the spaces between the muffles, heretofore occupied by the heating gases, may be filled with heat insulating material such as sil-o-sel, magnesia, or the like.

We prefer in practicing our present invention, to conduct the operation in a continuous manner. This may be effected by progressively passing the lithopone through an appropriate receptacle or chamber and introducing into the lithopone and in contact therewith during such passage the highly heated non-reactive gas. Thus, for example, an upright or vertically disposed receptacle or chamber may be employed and the lithopone may be progressively passed therethrough by the action of gravity. Again, the lithopone may be progressively passed through an inclined and rotating cylindrical receptacle or chamber through which the highly heated non-reactive gas is simultaneously passed. Preferably, the lithopone and the heating gas pass through the receptacle or chamber in relatively opposite directions. It will, of course, be understood that lithopone-containing receptacles or chambers of this type are also carefully covered and protected by appropriate heat-insulating materials, so as to conserve as far as practicable the heat applied to the interior of the chamber or receptacle.

It will be understood from the foregoing description that our present invention contemplates heating the lithopone in large part at least by heat derived from the highly heated non-reactive gas introduced into the lithopone and in contact therewith. To this end, it is our aim to supply to the lithopone through the medium of the highly heated non-reactive gas all of the heat required for the calcining operation. However, in order that insulation may be as complete as possible, it may be desirable in some cases to surround the calcining chamber or receptacle with an insulating heat chamber and to heat this latter chamber electrically or by hot products of combustion or otherwise. Under such conditions a certain amount of heat may be transferred to the lithopone in the calcining chamber, but the amount of heat so transferred to the lithopone will be relatively small, since it is the intention of our present invention to heat the lithopone for the most part by direct contact with the highly heated non-reactive gas, and not by conduction of heat through the walls of the calcining chamber as has heretofore been the common practice.

The necessity of a proper atmosphere protecting the lithopone from oxidizing or other detrimental influences during the muffling or calcining operation has heretofore been recognized and, in certain cases, it has been customary to introduce a neutral or reducing gas, such, for example, as steam or producer gas, into the muffle, so as to maintain a neutral or reducing atmosphere above the charge and prevent the ingress of air. The introduction of such neutral or reducing gases into the lithopone is not, however, intended to heat the lithopone, and in such prior art practices little, if any, heat is actually supplied to the lithopone by such gases. In the practice of the improved method of our present invention, it is, of course, essential that appropriate precautions be observed to protect the lithopone undergoing calcination from oxidizing or other detrimental influences. In other words, the calcination of the lithopone should be conducted in the presence of a non-reactive environment, and by non-reactive environment, we mean an environment which will not cause the lithopone to become highly or objectionably light-sensitive when raised to the desired calcining temperature, that being the temperature to which it is necessary to raise the lithopone in order to give it appropriate strength or hiding power as a pigment.

In the accompanying drawing, we have illustrated a construction of apparatus particularly well adapted for the practice of our present invention. It is to be understood that this particular type and construction of apparatus is illustrated merely for purposes of explanation and that, as heretofore stated, various other types of apparatus may be used in practicing the invention.

Referring now to the drawing, the apparatus there illustrated comprises a lithopone-containing chamber or receptacle in the form of a relatively long tube 5. The tube 5 may conveniently be two to three feet in diameter and from thirty to one hundred feet in length. The tube is operatively disposed in an inclined position so as to permit the passage of the lithopone therethrough by the action of gravity when the tube is rotated as hereinafter more particularly explained. The tube 5 may be constructed of fire brick, porcelain, iron, calorized iron, nichrome, or of other appropriate material.

Surrounding the tube 5 and appropriately spaced therefrom is a cylindrical casing or shell 6 of iron, steel, or other appropriate material. The tube 5 and casing 6 are mechanically united to form a unitary structure, but thermally separated as much as possible, and the space between these two elements is filled with heat-insulating material. At suitable intervals along the length of the tube, for example, near each end and near the middle, as indicated in the drawing, we prefer to fill the space between the tube 5 and the casing 6 with heat insulating brick-work 7. Sil-o-cel brick may advantageously be employed for the brick work 7. In addition to its seat insulating properties, the brick work 7 imparts a desired degree of rigidity and mechanical strength to the rotating structure as a whole. The spaces between the brick-work 7 may be filled with sil-o-cel 8 or other appropriate heat-insulating material.

The rotating structure, consisting of the tube 5, casing 6 and intervening heat-insulating material, is appropriately mounted on rollers 9 and is adapted to be slowly rotated by means of a circular rack 10, secured to and surrounding the casing 6, and a pinion 11 driven from any appropriate source of power.

The crude lithopone to be calcined is charged into the tube 5 at its upper end by means of a screw conveyor feeding means 12 communicating with the lower end of a feed hopper 13. The casing of the screw conveyor 12 extends through a central opening in the end cover 14 of the rotating structure. The end cover 14 is preferably built of heat insulating material and an appropriate space is maintained between the cover and the casing of the screw conveyor 12 to permit the discharge from the tube 5 of the exit or exhaust non-reactive gas.

The lower end of the rotating structure is closed by a stationary cover 15 of good heat insulating material or appropriately protected by heat insulating material. The cover 15 has an opening 16 in its lower side to permit the discharge of the calcined lithopone from the retort 5 into a tub 17 containing cold water, or the like. The calcined lithopone is preferably discharged from the opening 16 into the water in the tub 17 through a discharge pipe having a lock seal to prevent ingress of air. Thus in the drawing, we have indicated a star wheel discharge operatively mounted in a pipe 20 communicating with the opening 16. This star wheel discharge comprises a rotatably mounted star wheel 21 having four blades or wings. The star wheel is given a quarter turn at predetermined intervals. The star wheel may be turned manually or by means of a gear train 22—23, in which an appropriate number of teeth on the driving member 23 is omitted so as to obtain the desired periodic turning of the star wheel. It will, of course, be understood that various other devices may be employed for actuating the star wheel and that other instrumentalities may be employed for effecting the discharge of the calcined lithopone from the lower end of the retort 5 in such a manner as to prevent the ingress of air into the retort.

The highly heated non-reactive gas is introduced into the lower end of the tube 5 by means of a pipe 18. It will be understood that the pipe 18, as well as all parts of the apparatus for heating the non-reactive gas, are covered with or protected by heat insulating material to minimize heat radiation therefrom. We prefer now to employ steam as the non-reactive gas, and steam at the desired high temperature may be produced by vaporizing water in an appropriate boiler and passing the water vapor through a superheater and thereby raising the temperature of the water vapor to the desired point. The water vapor or steam may be heated, preferably at low pressures (slightly above atmospheric pressure), to a temperature of from 700 to 800° C. in superheaters made of iron, calorized iron, nichrome or other heat-resisting material, or the superheating may be effected in conjunction with recuperative chambers of fire-brick or with regenerative fire-brick chambers.

The crude lithopone to be calcined is continuously fed into the tube 5 by the automatic feeding device at the upper end of the tube. The tube 5 may be substantially filled with lithopone, care being taken to prevent packing of the lithopone in the tube and to insure progressive passage of the lithopone through the tube. The highly heated non-reactive gas is introduced in appropriate quantity through the pipe 18 and at a temperature of say 700 to 800° C. This highly heated non-reactive gas passes through the lithopone in the tube 5 and ultimately all the lithopone in the tube is raised to the desired calcining temperature, usually in the neghborhood of from 650 to 750° C. The highly heated non-reactive gas not only raises the lithopone to the desired calcining temperature but also establishes and maintains a non-reactive environment throughout the entire critical period of the calcining operation.

The calcining of lithopone in accordance with the principles of our present invention is effected with greater heat economy than in any other process of calcining or muffling lithopone with which we are familiar. Moreover, the present invention insures a very high degree of uniformity in the heating of the irregular lumps or particles of the lithopone mass, with the consequent uniform calcining of the lithopone. By uniform calcining, we mean that substantially no part of the lithopone is over-heated and that substantially all of the lithopone is ultimately raised to the desired calcining temperature, that is, the temperature to which it is necessary to heat the lithopone in order to give the finished product the desired strength or hiding power as a pigment. Moreover, the method of the invention enables extreme accuracy of heat control, since the temperature of the highly heated non-reactive gas can be regulated and controlled within very narrow limits. This is of particular advantage in calcining lithopone because overheating of the lithopone with its attendant detrimental consequence can be avoided with certainty.

We claim:—

1. The method of calcining lithopone, which comprises heating the lithopone by passing therethrough and in contact therewith a non-reactive gas heated to a temperature approximating the temperature at which it is desired to calcine the lithopone whereby there is imparted to the lithopone in large part at least the heat required to raise the lithopone to the desired calcining temperature.

2. The method of calcining lithopone which comprises heating the lithopone by passing therethrough and in contact therewith a heated non-reactive gas whereby there is imparted to the lithopone in large part at least the heat required to raise the lithopone to the desired calcining temperature.

3. The method of calcining lithopone, which comprises heating the lithopone by passing therethrough and in contact therewith a non-reactive gas heated to a temperature in excess of the temperature at which it is desired to calcine the lithopone whereby there is imparted to the lithopone substantially all of the heat required to raise the lithopone to the desired calcining temperature.

4. The method of calcining lithopone, which comprises heating the lithopone, in large part at least, by passing therethrough and in contact therewith a non-reactive gas and thereby establishing and maintaining a non-reactive environment about the lithopone, said non-reactive gas being introduced into the lithopone at a temperature approximating the temperature at which it is desired to calcine the lithopone.

5. The method of calcining lithopone, which comprises progressively passing the lithopone through a non-reactive environment, and introducing into the lithopone and passing therethrough and in contact therewith during the passage of the lithopone through said environment a heated non-reactive gas whereby there is imparted to the lithopone in large part at least the heat required to raise the lithopone to the desired calcining temperature.

6. The method of calcining lithopone, which comprises progressively passing the lithopone through a non-reactive environment, and introducing into the lithopone and passing therethrough and in contact therewith during the passage of the lithopone through said environment a non-reactive gas, said non-reactive gas being introduced into the lithopone at a temperature approximating the temperature at which it is desired to calcine the lithopone and in such quantity that there is imparted to the lithopone in large part at least the heat required to raise the lithopone to the desired calcining temperature.

7. The method of calcining lithopone, which comprises introducing into the lithopone and passing therethrough and in contact therewith a non-reactive gas, said non-reactive gas being introduced into the lithopone at a temperature approximating the temperature at which it is desired to calcine the lithopone and in such quantity that there is imparted to the lithopone in large part at least the heat required to raise the lithopone to the desired calcining temperature.

In testimony whereof we affix our signatures.

JAMES A. SINGMASTER.
FRANK G. BREYER.